United States Patent [19]

Coran et al.

[11] 4,409,365

[45] Oct. 11, 1983

[54] THERMOPLASTIC RUBBER BLENDS COMPRISING CRYSTALLINE POLYOLEFIN, VULCANIZED MONO-OLEFIN RUBBER AND VULCANIZED NITRILE RUBBER

[75] Inventors: Aubert Y. Coran; Raman Patel, both of Akron, Ohio

[73] Assignee: Monsanto Company, St. Louis, Mo.

[21] Appl. No.: 443,355

[22] Filed: Nov. 22, 1982

[51] Int. Cl.$^3$ .................. C08L 9/02; C08L 23/16; C08L 23/26; C08L 53/00

[52] U.S. Cl. ........................... 525/78; 525/71; 525/74; 525/75; 525/93; 525/96; 525/88; 525/194; 525/233; 525/234

[58] Field of Search .................. 525/233, 194, 78, 88

[56] References Cited

U.S. PATENT DOCUMENTS

| | | | |
|---|---|---|---|
| 4,104,210 | 8/1978 | Coran et al. | 260/4 |
| 4,130,535 | 12/1978 | Coran et al. | 260/33.6 |
| 4,299,931 | 11/1981 | Coran et al. | 525/95 |
| 4,311,628 | 1/1982 | Abdou-Sabet et al. | 260/33.6 |
| 4,388,413 | 7/1982 | Coran et al. | 525/179 |

*Primary Examiner*—Carman J. Seccuro
*Attorney, Agent, or Firm*—Larry R. Swaney

[57] ABSTRACT

Thermoplastic rubber blends are described comprising monoolefin rubber and nitrile rubber which blends exhibit extraordinary oil resistance.

14 Claims, No Drawings

THERMOPLASTIC RUBBER BLENDS COMPRISING CRYSTALLINE POLYOLEFIN, VULCANIZED MONO-OLEFIN RUBBER AND VULCANIZED NITRILE RUBBER

This application relates to thermoplastic rubber blends comprising polyolefin resin, monoolefin rubber, and nitrile rubber.

BACKGROUND OF THE INVENTION

Monoolefin rubber-based elastoplastic compositions and nitrile rubber-based elastoplastic compositions are known. It was envisioned that blending these known compositions would result in blends useful in applications not satisfactorily met by the individual blend components. Surprisingly, the blends were found to possess extraordinary properties, especially better than expected oil resistance.

SUMMARY OF THE INVENTION

It has now been discovered that thermoplastic rubber blends comprising monoolefin rubber and nitrile rubber exhibit a valuable combination of properties including high strength, low brittle point and extraordinary oil resistance. The compositions of the invention are elastoplastic, i.e., they are elastomeric but are processable as a thermoplastic. They comprise a mixture of (a) an elastoplastic composition comprising a blend of crystalline polyolefin resin and vulcanized monoolefin rubber and (b) an elastoplastic composition comprising a blend of crystalline polyolefin resin and vulcanized nitrile rubber.

The properties of the compositions of the invention vary depending upon the relative proportions of polyolefin resin and vulcanized rubber and upon the relative proportions of monoolefin rubber and nitrile rubber. Compositions containing high proportions of polyolefin resin exhibit high tensile strength and are more fabricable. Compositions containing high proportions of rubber exhibit lower tension set and compression set. Compositions containing high proportions of monoolefin rubber exhibit low brittle points, whereas, compositions containing high proportions of nitrile rubber exhibit better oil resistance. Surprisingly, however, the compositions of the invention exhibit better oil resistance (lower oil swell) than would be expected based upon properties and proportions of the components.

Generally, the elastoplastic compositions of the invention comprise a mixture of about 10 to 75 parts by weight of (a) an elastoplastic composition comprising a blend of about 15 to 75 parts by weight of crystalline polyolefin resin and correspondingly, 85 to about 25 parts by weight of vulcanized monoolefin rubber, and correspondingly, 90 to about 25 parts by weight of (b) an elastoplastic composition comprising a blend of about 25 to 75 parts by weight of crystalline polyolefin resin, and correspondingly, 75 to about 25 parts by weight of vulcanized nitrile rubber. Preferred compositions comprise a mixture of 20 to 60 parts by weight of (a) and correspondingly, 80 to 40 parts by weight of (b). More preferred are compositions in which (a) comprises a blend of 25 to 50 parts by weight of crystalline polyolefin resin, and correspondingly, 75 to 50 parts by weight of vulcanized monoolefin rubber, and in which (b) comprises a blend of 50 to 75 parts by weight of crystalline polyolefin resin, and correspondingly, 50 to 25 parts by weight of vulcanized nitrile rubber.

A composition of the invention may be prepared by first separately preparing a blend of polyolefin resin and vulcanized monoolefin rubber and a blend of polyolefin resin and vulcanized nitrile rubber. Each of the blends may be prepared in accordance with U.S. Pat. Nos. 4,104,210; 4,130,535; 4,299,931; and 4,311,628, the disclosures of which are incorporated herein by reference. Preferred nitrile rubber blends are those of U.S. Pat. No. 4,299,931 in which a compatibilizing block copolymer is present. Preferred monoolefin rubbers are those comprising EPDM rubber and, especially those of U.S. Pat. No. 4,311,628, in which the EPDM is vulcanized with phenolic curative. The two independently prepared blends are then melt mixed by the use of conventional mixing equipment to obtain a composition of the invention.

Suitable thermoplastic polyolefin resins comprise crystalline, high molecular weight solid products from the polymerization of one or more monoolefins by either high pressure or low pressure processes. Examples of such resins are isotactic and syndiotactic monoolefin polymer resins, representative members of which are commercially available. Examples of satisfactory olefins are ethylene, propylene, 1-butene, 1-pentene, 1-hexene, 2-methyl-1-propene, 3-methyl-1-pentene, 4-methyl-1-pentene, 5-methyl-1-hexene and mixtures thereof. Commercially available thermoplastic polyolefin resins, and preferably polyethylene or polypropylene, may be advantageously used in the practice of the invention, with polypropylene being preferred.

Any monoolefin rubber which can be vulcanized with rubber curatives is satisfactory in the practice of the invention. Suitable monoolefin terpolymer rubber comprises essentially non-crystalline, rubbery terpolymer of two or more alpha monoolefins, preferably copolymerized with at least one polyene, usually a non-conjugated diene which rubber herein and in the claims is referred to as "EPDM rubber". Satisfactory EPDM rubbers comprise the products from the polymerization of monomers comprising two monoolefins, generally ethylene and propylene, and a lesser quantity of non-conjugated diene. The amount of non-conjugated diene is usually 2-10 weight percent of the rubber. Grades of monoolefin rubbers suitable for the practice of the invention are commercially available *Rubber World Blue Book*, 1980 Edition, Materials and Compounding Ingredients for Rubber, pages 370-378. EPDM rubbers are preferred.

Suitable nitrile rubbers comprise rubbery polymers of 1,3-butadiene or isoprene and acrylonitrile. Preferred nitrile rubbers comprise polymers of 1,3-butadiene and about 20-50 weight percent acrylonitrile. A "functionalized" nitrile rubber containing one or more graft forming functional groups is preferred for preparing block copolymer compatibilizers which can be used in the preparation of preferred separately prepared polyolefin—nitrile rubber compositions. The "graft forming functional groups" are different from and are in addition to the olefinic and cyano groups normally present in nitrile rubber. Carboxylic-modified nitrile rubbers containing carboxy groups and amine-modified nitrile rubbers containing amino groups are especially useful for the preparation of compatibilizing block copolymers comprising segments of nitrile rubber. Any nitrile rubber, regardless of molecular weight, is suitable for the preparation of block copolymer, but, liquid nitrile rubbers having molecular weights of less than 50,000 are preferred for this purpose. This contrasts with the nitrile rubber component of the blend which is a "solid" rubber having an average molecular weight of at least 50,000, and preferably, between about 100,000–1,000,000. Commercially available nitrile rubbers suitable for the practice of the invention are described in *Rubber World Blue Book*, 1980 Edition, Materials and Compounding Ingredients for Rubber, pages 386–406.

Improved blend compositions of the invention can be used to form a variety of molded, extruded, or calendared articles. The properties of the blend depend upon the proportions of the components in the blend with a wide range of properties being available simply by varying the proportions of the blend components.

PREFERRED EMBODIMENTS

Elastoplastic compositions comprising nitrile rubber and polypropylene are prepared by dynamic vulcanization as described in U.S. Pat. No. 4,299,931. The compositions comprise the components shown in Table 1. All parts are by weight. The nitrile rubber is Hycar ® 1092-80 and the amine-terminated nitrile rubber is Hycar ® ATBN 1300X16. The polypropylene is Profax ® 6723. Maleic acid modified polypropylene is prepared by melt mixing 100 parts by weight of polypropylene and 5 parts by weight of maleic acid. After a homogeneous mixture is obtained, one part by weight of an organic peroxide (Lupersol ® 101) is added and mixing is continued until a constant consistency is obtained. A phenolic curative comprising dimethylol-p-octylphenol (SP-1045) and stannous chloride is used to cure the rubber. A stabilizer (Naugard ® 495) is added at a level of 2 parts by weight per 100 parts by weight of nitrile rubber.

TABLE 1

|  | EP-NBR-1 | EP-NBR-2 | EP-NBR-3 |
| --- | --- | --- | --- |
| Nitrile Rubber | 67.5 | 45 | 22.5 |
| Amine-Nitrile Rubber | 7.5 | 5 | 2.5 |
| Polypropylene | 21.4 | 45 | 67.5 |
| 5% MA-Modified PP | 3.6 | 5 | 7.5 |
| SP-1045 | 5.63 | 3.75 | 1.88 |
| $SnCl_2.2H_2O$ | 0.75 | 0.5 | 0.25 |
| Naugard 495 | 1.5 | 1.0 | 0.5 |

Elastoplastic compositions comprising clay-reinforced, oil-extended EPDM rubber and polypropylene are Santoprene ® rubber. The 201-73 grade has a nominal Shore A hardness of 73 and comprises a blend of about 63 parts by weight of EPDM rubber, and correspondingly, 37 parts by weight of polypropylene. The 201-97 grade has a nominal Shore A hardness of 87 and comprises a blend of about 38 parts by weight of EPDM rubber, and correspondingly, 62 parts by weight of polypropylene.

Compositions of the invention are prepared by mixing various proportions of the compositions of Table 1 and SANTOPRENE ® rubber. The materials are melt-mixed in a Brabender mixer at about 190° C. for 5 minutes. The compositions are removed, then returned to the mixer and remixed for two additional minutes. The compositions are compression molded at 225° C. The properties of the resulting compositions are shown in Tables 2 and 3.

Stocks 1–4 are controls comprising unblended elastoplastic compositions. The data show that the compositions of the invention exhibit a valuable combination of properties. For example, in Table 1, the blends containing equal proportions of nitrile rubber-based elastoplastic composition, Stocks 8–10 exhibit high tensile strengths and low brittle points. Surprisingly, the oil resistance is better than expected. The actual oil swell is lower than would be predicted by the average value calculated from the oil swell of the individual components. The specimens swell 8.1% to 12.3% less than theory. This represents a 19 to 30 percent improvement.

TABLE 2

|  | 1 | 2 | 3 | 4 | 5 | 6 | 7 | 8 | 9 | 10 | 11 | 12 | 13 |
| --- | --- | --- | --- | --- | --- | --- | --- | --- | --- | --- | --- | --- | --- |
| Santoprene ® 201-73 Rbr. | 100 | — | — | — | 25 | 25 | 25 | 50 | 50 | 50 | 75 | 75 | 75 |
| EP-NBR-1 | — | 100 | — | — | 75 | — | — | 50 | — | — | 25 | — | — |
| EP-NBR-2 | — | — | 100 | — | — | 75 | — | — | 50 | — | — | 25 | — |
| EP-NBR-3 | — | — | — | 100 | — | — | 75 | — | — | 50 | — | — | 25 |
| Properties |  |  |  |  |  |  |  |  |  |  |  |  |  |
| TS, MPa | 9.3 | 18.6 | 24.9 | 20.4 | 15.9 | 20.9 | 24.5 | 13.2 | 16.4 | 19.8 | 12.0 | 12.8 | 13.6 |
| $M_{100}$, MPa | 3.4 | 6.7 | 11.9 | 17.9 | 4.9 | 9.0 | 13.7 | 4.3 | 6.7 | 9.6 | 3.8 | 4.9 | 6.2 |
| Elong., % | 430 | 460 | 550 | 520 | 470 | 550 | 610 | 450 | 500 | 540 | 460 | 470 | 480 |
| Brittle Point, °C. | −63 | −26 | −26 | −15 | −26 | −31 | −31 | −36 | −45 | −51 | −56 | −56 | −57 |
| ASTM #3 Oil Swell, Vol. % |  |  |  |  |  |  |  |  |  |  |  |  |  |
| Actual | 63.9 | 23.5 | 20.6 | 18.8 | 26.7 | 23.7 | 21.2 | 35.6 | 32.7 | 29.0 | 48.2 | 45.2 | 43.0 |
| Theory | — | — | — | — | 33.6 | 31.4 | 30.0 | 43.7 | 42.2 | 41.3 | 53.7 | 53.0 | 52.6 |
| Δ | — | — | — | — | 6.9 | 7.7 | 8.8 | 8.1 | 9.5 | 12.3 | 5.5 | 7.8 | 9.6 |
| % Improvement | — | — | — | — | 21 | 25 | 29 | 19 | 23 | 30 | 10 | 15 | 18 |

TABLE 3

|  | 1 | 2 | 3 | 4 | 5 | 6 | 7 | 8 | 9 | 10 | 11 | 12 | 13 |
| --- | --- | --- | --- | --- | --- | --- | --- | --- | --- | --- | --- | --- | --- |
| Santoprene ® 201-87 Rbr. | 100 | — | — | — | 25 | 25 | 25 | 50 | 50 | 50 | 75 | 75 | 75 |
| EP-NBR-1 | — | 100 | — | — | 75 | — | — | 50 | — | — | 25 | — | — |
| EP-NBR-2 | — | — | 100 | — | — | 75 | — | — | 50 | — | — | 25 | — |
| EP-NBR-3 | — | — | — | 100 | — | — | 75 | — | — | 50 | — | — | 25 |
| Properties |  |  |  |  |  |  |  |  |  |  |  |  |  |
| TS, MPa | 16.4 | 18.6 | 24.9 | 20.4 | 17.2 | 20.3 | 25.5 | 16.4 | 19.5 | 21.4 | 15.8 | 16.1 | 19.4 |
| $M_{100}$, MPa | 6.9 | 6.7 | 11.9 | 17.9 | 6.0 | 10.5 | 14.6 | 6.4 | 8.9 | 12.3 | 6.8 | 8.1 | 9.3 |
| Elong., % | 490 | 460 | 550 | 520 | 490 | 520 | 600 | 470 | 530 | 540 | 450 | 470 | 540 |
| Brittle Point, °C. | −61 | −26 | −26 | −15 | −31 | −29 | −29 | −34 | −40 | −43 | −46 | −52 | −51 |
| ASTM #3 Oil Swell, Vol. % |  |  |  |  |  |  |  |  |  |  |  |  |  |
| Actual | 40.2 | 23.5 | 20.6 | 18.8 | 24.4 | 22.3 | 19.7 | 28.7 | 25.6 | 24.0 | 34.9 | 33.0 | 30.6 |

TABLE 3-continued

|  | 1 | 2 | 3 | 4 | 5 | 6 | 7 | 8 | 9 | 10 | 11 | 12 | 13 |
|---|---|---|---|---|---|---|---|---|---|---|---|---|---|
| Theory | — | — | — | — | 27.7 | 25.5 | 24.1 | 31.9 | 30.4 | 29.5 | 36.0 | 35.3 | 34.8 |
| Δ | — | — | — | — | 3.3 | 3.2 | 4.4 | 3.2 | 4.8 | 5.5 | 1.1 | 2.3 | 4.2 |
| % Improvement | — | — | — | — | 12 | 13 | 18 | 10 | 16 | 19 | 3 | 7 | 12 |

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. An elastoplastic composition comprising a mixture of about 10 to 75 parts by weight of (a) an elastoplastic composition comprising a blend of about 15 to 75 parts by weight of crystalline polyolefin resin and, correspondingly, 85 to about 25 parts by weight of vulcanized monoolefin rubber, and, correspondingly, 90 to about 25 parts by weight of (b) an elastoplastic composition comprising a blend of about 25 to 75 parts by weight of crystalline polyolefin resin, and correspondingly, 75 to about 25 parts by weight of vulcanized nitrile rubber.

2. The composition of claim 1 in which the monoolefin rubber is EPDM rubber.

3. The composition of claim 1 which comprises a mixture of 20 to 60 parts by weight of (a) and correspondingly, 80 to 40 parts by weight of (b).

4. The composition of claim 3 in which (a) comprises a blend of 25 to 50 parts by weight of crystalline polyolefin resin, and correspondingly, 75 to 50 parts by weight of vulcanized EPDM rubber.

5. The composition of claim 4 in which (b) comprises a blend of 50 to 75 parts by weight of crystalline polyolefin resin, and correspondingly, 50 to 25 parts by weight of vulcanized nitrile rubber.

6. The composition of claim 5 in which (b) comprises a block copolymer to enhance the compatibility of the nitrile rubber and polypropylene.

7. The composition of claim 6 in which the crystalline polyolefin resin is polypropylene.

8. The composition of claim 7 in which the block copolymer comprises segments derived from amine-terminated nitrile rubber and maleic acid modified polypropylene.

9. The composition of claim 8 in which the EPDM rubber and nitrile rubber are vulcanized by phenolic curative.

10. An elastoplastic composition comprising a blend of 20 to 80 parts by weight of crystalline polyolefin resin and correspondingly, 80 to 20 parts by weight of vulcanized rubber which comprises 15 to 75 parts by weight of monoolefin rubber and correspondingly, 85 to 25 parts by weight of nitrile rubber.

11. The composition of claim 10 in which the monoolefin rubber is EPDM rubber.

12. The composition of claim 11 in which the polyolefin resin is polypropylene.

13. The composition of claim 12 which comprises a blend of 40 to 70 parts by weight of polypropylene and correspondingly, 60 to 30 parts by weight of vulcanized rubber.

14. The composition of claim 12 in which the vulcanized rubber comprises 40 to 75 parts by weight of EPDM rubber and correspondingly, 60 to 25 parts by weight of nitrile rubber.

* * * * *